United States Patent
Naitou

(10) Patent No.: US 6,801,124 B2
(45) Date of Patent: Oct. 5, 2004

(54) MOVEABLE OBJECT BURGLAR ALARM APPARATUS FOR NOTIFYING USERS OF A THEFT

(75) Inventor: Norihiro Naitou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/359,655

(22) Filed: Feb. 7, 2003

(65) Prior Publication Data

US 2003/0174051 A1 Sep. 18, 2003

(30) Foreign Application Priority Data

Mar. 13, 2002 (JP) ........................................ 2002-069043

(51) Int. Cl.[7] .............................................. B60R 25/10
(52) U.S. Cl. ........................... 340/426.19; 340/539.18; 340/426.2; 307/10.2
(58) Field of Search .................. 340/426.19, 426.2, 340/426.25, 988, 989, 433, 434, 426, 539.16, 539.18, 506; 701/9; 307/10.2; 455/404.1, 456.1, 405, 564; 709/318

(56) References Cited

U.S. PATENT DOCUMENTS 5,917,405 A * 6/1999 Joao ...................... 340/426.17
6,442,241 B1 * 8/2002 Tsumpes .................... 379/45
2002/0133462 A1 * 9/2002 Shteyn ....................... 705/44

FOREIGN PATENT DOCUMENTS

JP            2955702            7/1999

* cited by examiner

*Primary Examiner*—Jeffery Hofsass
*Assistant Examiner*—Eric Blount
(74) *Attorney, Agent, or Firm*—Sughrue Mion, PLLC

(57) ABSTRACT

A moving object burglar alarm apparatus includes an inquiry unit for, when a theft detection unit detects a theft of a moving object, inquiring whether the moving object burglar alarm apparatus should make a notification about the theft of the moving object of communication terminal equipment disposed outside the moving object burglar alarm apparatus, and a theft notification unit for determining whether the theft notification unit should notify the notification center of the theft of the moving object according to an answer to the inquiry from the communication terminal equipment, and for notifying the notification center of the theft of the moving object when the answer indicates that a notification about the theft is requested.

4 Claims, 10 Drawing Sheets

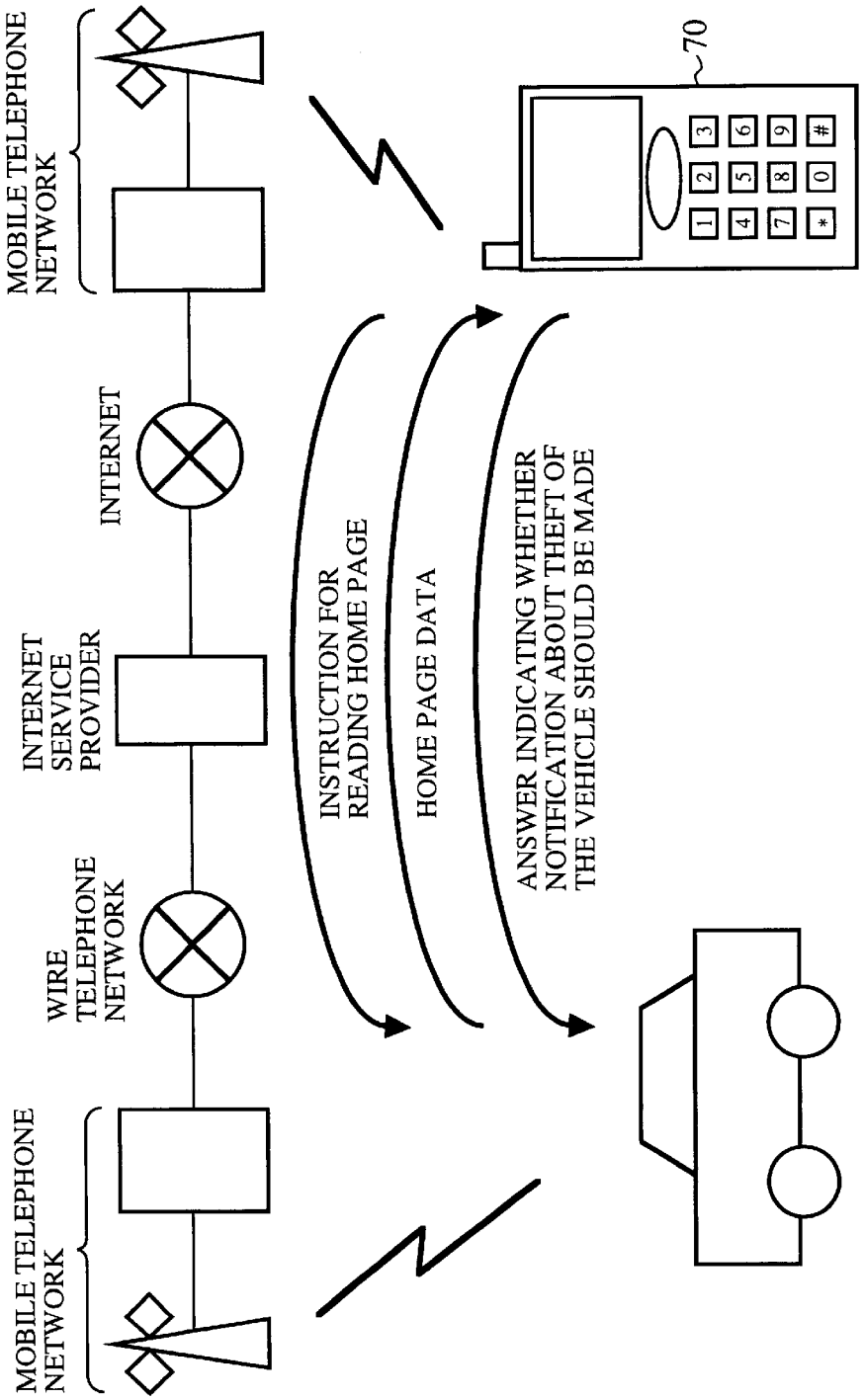

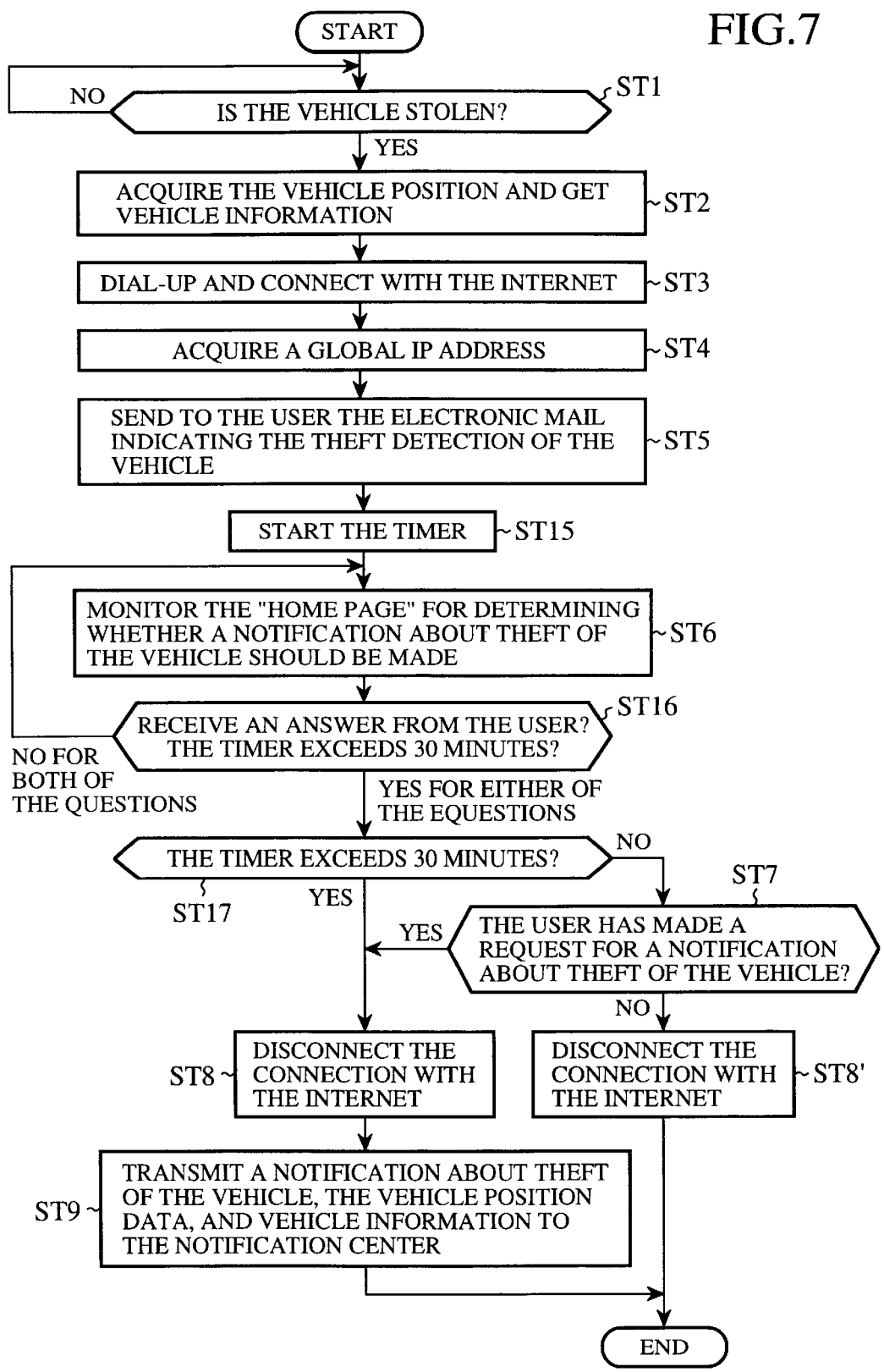

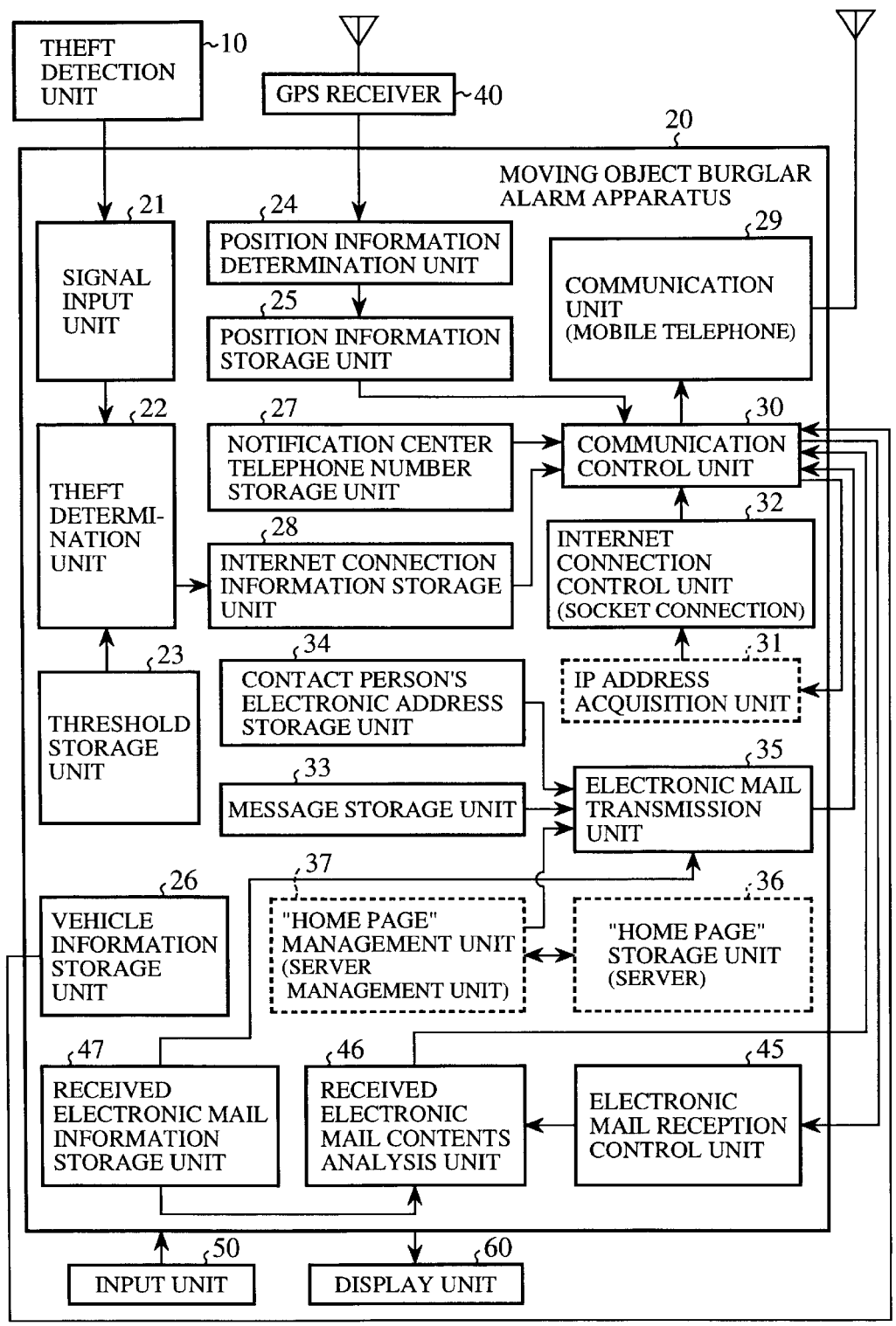

MOVEABLE OBJECT BURGLAR ALARM APPARATUS FOR NOTIFYING USERS OF A THEFT

BACKGROUND OF THE INVENTION

1. Field of the Invention

The present invention relates to a moving object burglar alarm apparatus that, in the event of theft of a moving object equipped with the moving object burglar alarm apparatus, enables users to take theft-prevention measures by automatically notifying a notification center of the theft of the moving object.

2. Description of Related Art

For example, Japanese patent No. 2955702 entitled "Emergency notification apparatus intended for vehicles" discloses an apparatus for detecting a theft of a moving object and notifying a notification center of the theft of the moving object. When a vehicle is started by using a mechanism other than a key used for starting the vehicle, the apparatus determines that the vehicle is stolen and transmits an emergency alert signal, position information about the current position of the vehicle acquired by reception of GPS signals and so on to the notification center so that the notification center can keep track of the vehicle.

A prior art apparatus that detects occurrence of a theft of the vehicle before the vehicle is started is proposed as a mechanism for detecting occurrence of a theft of the vehicle as early as possible. In this case, an area sensor or a shock sensor (i.e., an impact detection sensor) can be used as the mechanism for detecting a theft of the vehicle before the vehicle is started. The area sensor is a sensor that senses infrared rays emitted out of human bodies and detects a person's approach to the vehicle. On the other hand, the shock sensor is a sensor that detects an impact on the vehicle. The shock sensor detects an impact on the vehicle when a wind glass is broken or a door is broken open.

A problem encountered with the prior art vehicle burglar alarm apparatus (moving object burglar alarm apparatus) constructed as mentioned above is that because the vehicle burglar alarm apparatus is so constructed as to detect occurrence of a theft of the vehicle as early as possible, the area sensor that uses infrared rays works even if a dog or cat approaches the vehicle or the shock sensor detects an impact on the vehicle at such a time as the time when raindrops hit a wind glass, so that in such cases the vehicle burglar alarm apparatus erroneously detects occurrence of a theft of the vehicle. Another problem is that because the vehicle may be used in a severe environment, the vehicle burglar alarm apparatus might malfunction because of failures that occur in the sensor or a peripheral circuit and this results in erroneous detection of occurrence of a theft of the vehicle. When the sensor erroneously detects occurrence of a theft of the vehicle or malfunctions, the prior art vehicle burglar alarm apparatus sends unnecessary notification about occurrence of a theft of the vehicle to the notification center, and this results in useless use of center facilities including a communication mechanism for enabling the prior art vehicle burglar alarm apparatus to communicate with the notification center and hence useless use of the ability of the notification center. A further problem is that it is a useless exposure of privacy to notify the notification center of the vehicle position when the sensor erroneously detects occurrence of a theft of the vehicle while the user normally uses the vehicle.

SUMMARY OF THE INVENTION

The present invention is proposed to solve the above-mentioned problems, and it is therefore an object of the present invention to provide a moving object burglar alarm apparatus that, when a moving object is stolen, enables a party to the moving object to determine whether the moving object burglar alarm apparatus should make a notification about the theft of the moving object before sending the notification about the theft of the moving object to a notification center.

In accordance with an aspect of the present invention, there is provided a moving object burglar alarm apparatus including an inquiry unit for, when a theft detection unit detects a theft of a moving object, inquiring whether the moving object burglar alarm apparatus should make a notification about the theft of the moving object of communication terminal equipment disposed outside the moving object burglar alarm apparatus, and a theft notification unit for determining whether the theft notification unit should notify the notification center of the theft of the moving object according to an answer to the inquiry from the communication terminal equipment, and for notifying the notification center of the theft of the moving object when the answer indicates that a notification about the theft is requested.

As a result, because the moving object burglar alarm apparatus enables a party to the vehicle to recognize occurrence of a theft of the vehicle from a notification about detection of the occurrence of the theft of the vehicle before notifying the notification center of the occurrence of the theft of the vehicle, and then notifies the notification center of the occurrence of the theft of the vehicle only when the party to the vehicle makes a request for the notification, the moving object burglar alarm apparatus can prevent notification about a theft of the vehicle from being made when the theft detection unit erroneously detects a theft of the vehicle or malfunctions and can also prevent an outflow of unnecessary position information about the position of the moving object. Furthermore, because the notification center does not receive any notification that the party to the moving object do not desire and needs not check the position of the moving object, useless use of facilities of the notification center can be prevented.

Further objects and advantages of the present invention will be apparent from the following description of the preferred embodiments of the invention as illustrated in the accompanying drawings.

BRIEF DESCRIPTION OF THE DRAWINGS

FIG. 5 is a block diagram showing transmission of "home page" data from the moving object burglar alarm apparatus according to embodiment 1 to the communication terminal equipment;

FIG. 7 is a flow chart showing an operation of a moving object burglar alarm apparatus according to a variant of embodiment 1;

FIG. 8 is a block diagram showing the structure of a moving object burglar alarm apparatus according to embodiment 2 of the present invention;

DETAILED DESCRIPTION OF THE PREFERRED EMBODIMENTS

The invention will now be described with reference to the accompanying drawings.

Embodiment 1

A moving object equipped with a moving object burglar alarm apparatus according to the present invention can be a vehicle, a small ship, an expensive cargo stored in a warehouse, or the like. In embodiments 1 and 2, an explanation will be made assuming that the moving object is a vehicle.

Figure 1:
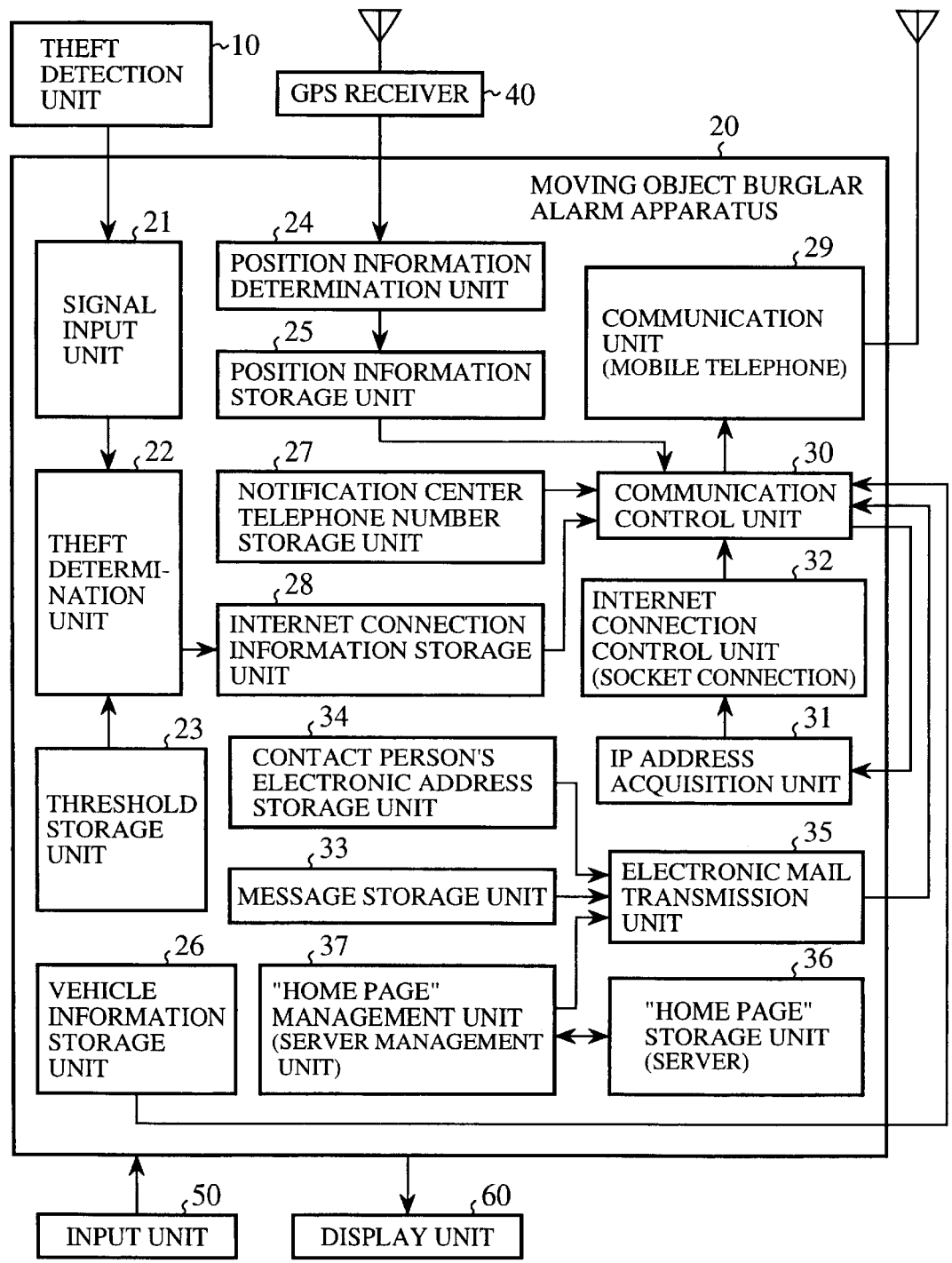
FIG. 1 is a block diagram showing the structure of a moving object burglar alarm apparatus according to embodiment 1 of the present invention.

FIG. 1 is a block diagram showing the structure of a moving object burglar alarm apparatus according to embodiment 1 of the present invention. In the figure, reference numeral 10 denotes a theft detection unit that consists of an area sensor that is an infrared sensor that detects a person's approach, an impact sensor that is an acceleration sensor that detects an impact on the moving object when a window glass is broken, for example, or the like. The theft detection unit 10 can be constructed of a single sensor that is any one of those sensors or a combination of two or more of those sensors and can detect that someone is trying to invade the vehicle. Reference numeral 20 denotes the moving object burglar alarm apparatus that is installed in the vehicle and manages an entire notification system that makes a notification about a theft of the vehicle, and reference numeral 40 denotes a GPS (Global Positioning System) receiver that acquires position information about the current position of the vehicle.

The moving object burglar alarm apparatus 20 is provided with a signal input unit 21 for receiving a detection signal from the theft detection unit 10, a theft determination unit 22 for determining whether or not the vehicle is stolen from the detection signal received by the signal input unit 21, a threshold storage unit 23 for storing a threshold that is used when the theft determination unit 22 determines whether or not the vehicle is stolen from the detection signal, a position information determination unit 24 for determining the current position of the vehicle based on the position information acquired from the GPS receiver 40, a position information storage unit 25 for storing information about the determined current position of the vehicle (moving object position information) therein, a vehicle information storage unit 26 for storing vehicle information about the vehicle, such as a vehicle ID and the color of the vehicle, therein, a notification center telephone number storage unit 27 for storing a telephone number of a certain notification center which is notified of information (theft notification) about a theft of the vehicle as well as the vehicle position information by the moving object burglar alarm apparatus 20, and an internet connection information storage unit 28 for storing an ISP dial-up telephone number, a connection ID, and a password, which are needed to connect the moving object burglar alarm apparatus 20 to an Internet Service Provider (referred to as an ISP from here on), therein. When the moving object burglar alarm apparatus 20 notifies such a party to the vehicle as an owner of the vehicle, a user, or a manager of detection of a theft of the vehicle by way of the Internet, and inquires whether the moving object burglar alarm apparatus 20 should notify the notification center of a theft of the vehicle by way of the Internet, the internet connection information storage unit 28 is used.

The moving object burglar alarm apparatus 20 is further provided with a communication unit 29, such as a mobile telephone, for communicating with the ISP, the notification center, and a user's terminal equipment, a communication control unit 30 for controlling the communication unit 29, an IP address acquisition unit 31 for acquiring a global IP address of the moving object burglar alarm apparatus 20, which is provided by the ISP after the moving object burglar alarm apparatus 20 establishes connection with the Internet, an internet connection control unit 32 for performing setting of a socket to exchange data by way of the Internet, for example, a message storage unit 33 for storing messages to be sent to a party to the vehicle, such as a notification about detection of occurrence of a theft of the vehicle and an inquiry about whether the moving object burglar alarm apparatus 20 should make a notification about a theft of the vehicle, a contact person's electronic address storage unit 34 for storing an electronic mail address of the party to the vehicle therein, an electronic mail transmission control unit 35 for controlling transmission of an electronic mail to the electronic mail address of the party to the vehicle, the electronic mail including messages, such as a notification about occurrence of a theft of the vehicle and an inquiry about whether the moving object burglar alarm apparatus 20 should make a notification about a theft of the vehicle, and information (e.g., a "home page" address) indicating where the user writes an answer to the inquiry about whether the moving object burglar alarm apparatus 20 should make a notification about a theft of the vehicle, a "home page" storage unit 36 for storing a "home page", e.g., data file written in HTML, which enables the party to the vehicle to send an answer to the inquiry about whether the moving object burglar alarm apparatus 20 should make a notification about a theft of the vehicle to the moving object burglar alarm apparatus 20, and a "home page" management unit 37 for managing the "home page" storage unit 36.

An input unit 50 is a device for furnishing necessary information input thereto from outside the moving object burglar alarm apparatus 20 to the threshold storage unit 23, the notification center telephone number storage unit 27, the internet connection information storage unit 28, the contact person's electronic address storage unit 34, the vehicle information storage unit 26, the message storage unit 33, the "home page" storage unit 36, and so on, and consists of a keyboard, a remote controller, a touch panel, and so on. A display unit 60 is a monitor or the like that displays information stored in those storage units when necessary.

The input unit 50 and the display unit 60 can be connected to the moving object burglar alarm apparatus 20 when necessary.

When the signal from the theft detection unit 10 is an analog one, the signal input unit 21 can have an A/D converter for converting the analog signal into a digital signal. In a case where the theft detection unit 10 is an impact sensor, for example, the theft determination unit 22 can determine that a theft of the vehicle occurs when the detection signal acquired by way of the signal input unit 21 has a value that exceeds the threshold stored in the threshold storage unit 23, that is, when an acceleration (i.e., an impact) of a predetermined value or more is applied to the vehicle. As an alternative, the theft determination unit 22 can determine whether a theft of the vehicle occurs by using another technique such as an evaluation of a change in the acceleration applied to the vehicle with respect to time or how the acceleration changes within a certain time period (pattern matching with waveforms). In addition, data used for the determination can be stored in the threshold storage unit 23. The position information determination unit 24 reduces errors included in the position information acquired by the GPS receiver 40 by performing an averaging process on the position information, for example, determines the current position of the vehicle and stores information about it in the position information storage unit 25. A GPS receiver included in a navigation system is used as the GPS receiver 40. As an alternative, in the moving object burglar alarm apparatus 20, the GPS receiver 40 can be disposed independently of the one included in the navigation system.

Figure 2:
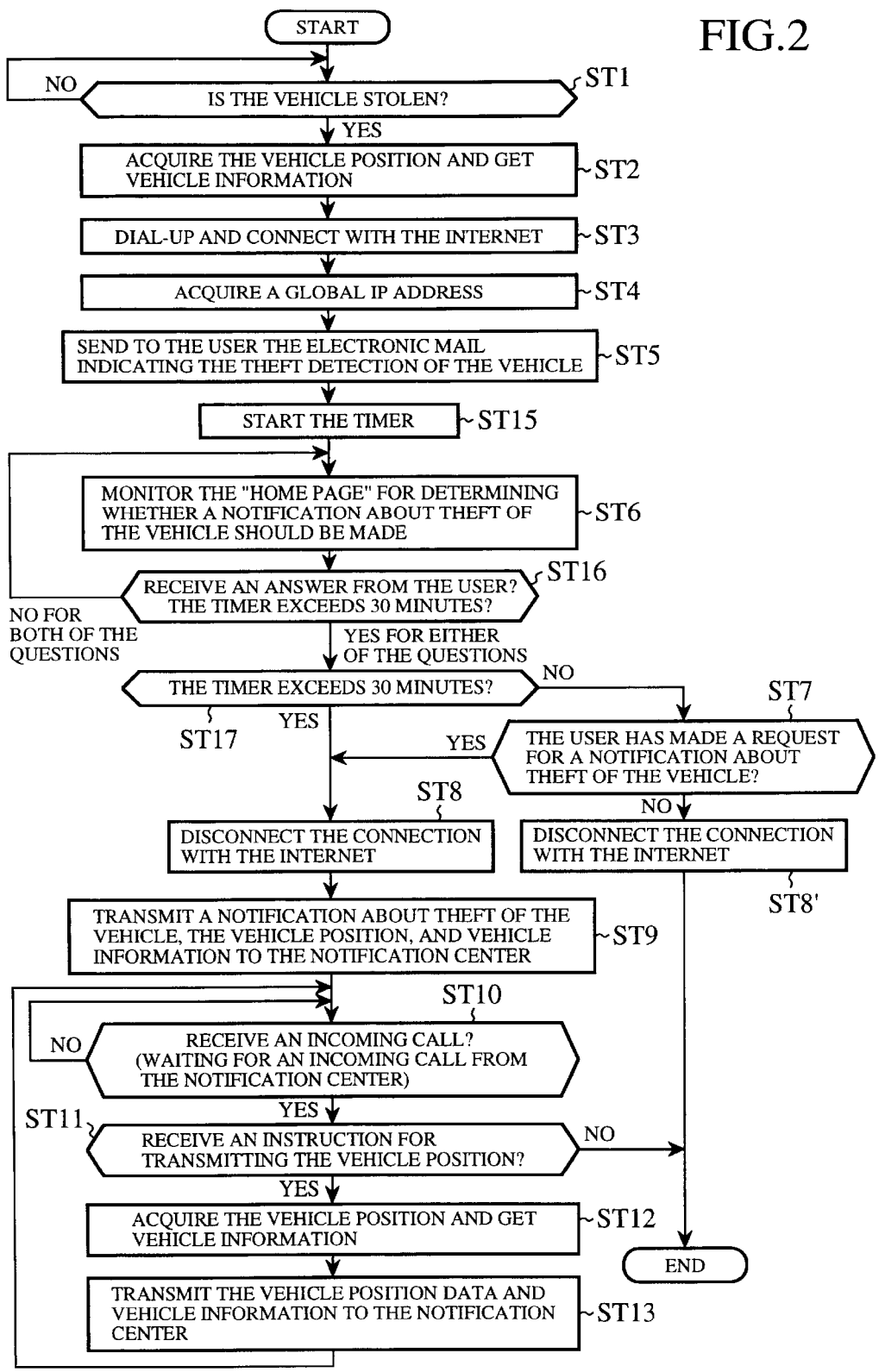
FIG. 2 is a flow chart showing an operation of the moving object burglar alarm apparatus according to embodiment 1.

Next, a description will be made as to an operation of the moving object burglar alarm apparatus 20. FIG. 2 is a flow chart showing the operation of the moving object burglar alarm apparatus. The theft determination unit 22 always monitors the detection signal delivered from the theft detection unit 10 by way of the signal input unit 21. For example, the theft determination unit 22 monitors the detection signal at predetermined intervals of 100 ms and determines that a theft of the vehicle occurs when the input detection signal has a value exceeds the threshold stored in the threshold storage unit 23 (in step ST1). When the theft determination unit 22 determines that a theft of the vehicle occurs, the communication control unit 30 acquires the vehicle position information from the position information storage unit 25 and gets the vehicle information, such as the vehicle ID, from the vehicle information storage unit 26 (in step ST2). The communication control unit 30 then sends an electronic mail to the party to the vehicle, the electronic mail including messages, such as a notification about detection of occurrence of a theft of the vehicle and an inquiry about whether the moving object burglar alarm apparatus 20 should make a notification about a theft of the vehicle, and the "home page" address indicating when the user (or the party to the vehicle) writes an answer to the inquiry about whether the moving object burglar alarm apparatus 20 should make a notification about a theft of the vehicle. To this end, the communication control unit 30 and the internet connection control unit 32 call the telephone number of the dial-up point stored in the internet connection information storage unit 28 by way of the communication unit 29, and sends the Internet connection ID and the password to the ISP by using the Internet connection protocol PPP (Point to Point Protocol) so as to establish Internet connection between the moving object burglar alarm apparatus 20 and the ISP (in step ST3).

In the moving object burglar alarm apparatus 20, the IP address acquisition unit 31 then inquires of the ISP about the location (i.e., global IP address) of the "home page" on the Internet from which the moving object burglar alarm apparatus 20 can acquire an answer to the inquiry about whether the moving object burglar alarm apparatus 20 should make a notification about a theft of the vehicle (in step ST4). The IP address acquisition unit 31 generates a "home page" address from which the moving object burglar alarm apparatus 20 can acquire the answer to the inquiry about whether the moving object burglar alarm apparatus 20 should make a notification about the theft of the vehicle based on the acquired global IP address.

When this preparation is complete, the electronic mail transmission control unit 35 retrieves messages stored in the message storage unit 33, such as a notification about detection of occurrence of a theft of the vehicle and an inquiry about whether the moving object burglar alarm apparatus 20 should make a notification about a theft of the vehicle, adds the generated "home page" address to the messages, and creates and sends an electronic mail including the messages to the electronic mail address of the party to the vehicle, which is stored in the contact person's electronic address storage unit 34 (in step ST5). Communication terminal equipment identified by the electronic mail address can be a mobile telephone, a mobile terminal, a personal computer, a job-oriented terminal, or the like. It is preferable that the communication terminal equipment is a mobile telephone owned by the party to the vehicle in order to allow the user to check the contents of any received electronic mail at hand at any time. The electronic mail transmission control unit 35 also starts a timer (not shown in the figure) when sending the electronic mail to the party to the vehicle (in step ST15). In order to allow the moving object burglar alarm apparatus 20 to do some processing when the "home page" management unit 37 does not receive any answer from the user to the inquiry about whether the moving object burglar alarm apparatus 20 should make a notification about a theft of the vehicle, the timer sets a predetermined time, e.g., 30 minutes. After sending the electronic mail, the "home page" management unit 37 monitors whether or not an answer is written in the "home page" on the Internet, which is provided by the moving object burglar alarm apparatus 20, by the terminal equipment owned by the party to the vehicle (in step ST6).

Figure 3:
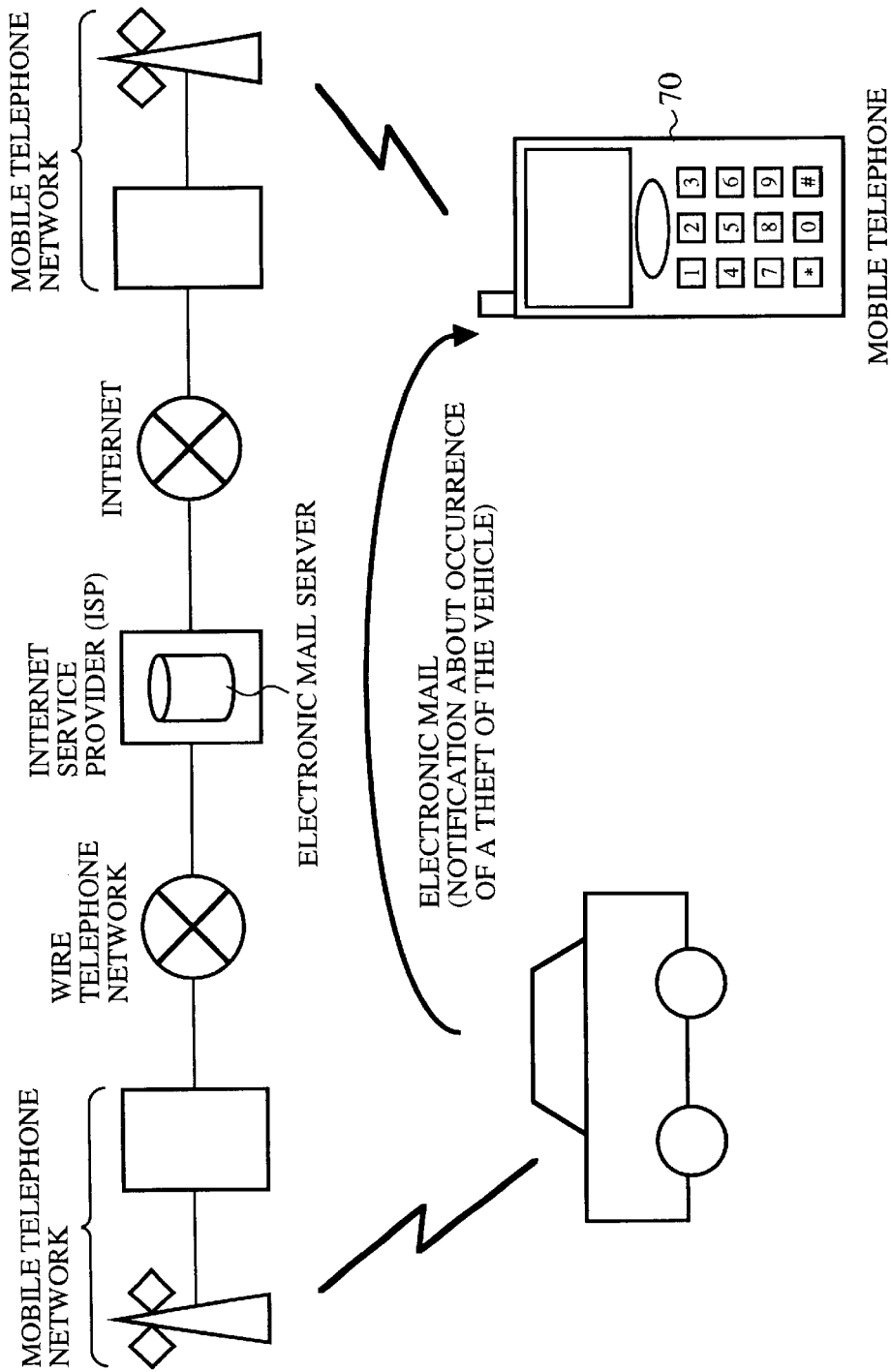
FIG. 3 is a block diagram showing a route via which the moving object burglar alarm apparatus according to embodiment 1 sends a notification about detection of occurrence of a theft of a moving object to communication terminal equipment.
Figure 4:
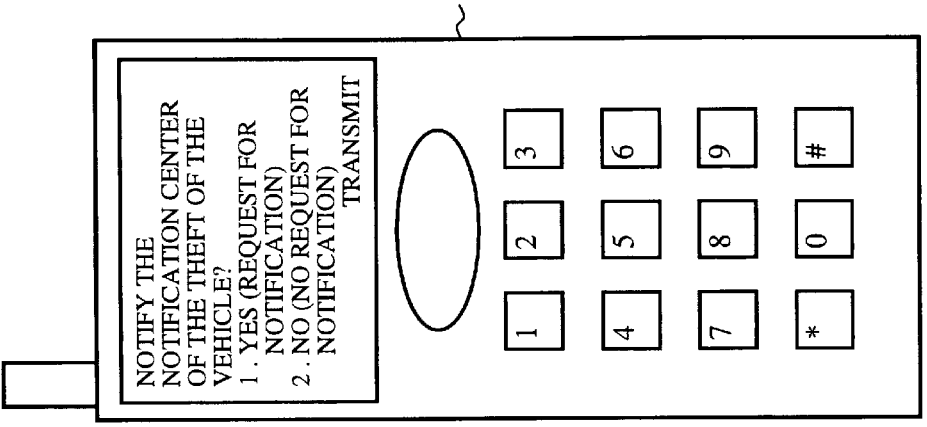
FIG. 4 is a diagram showing a display screen showing a notification about detection of occurrence of a theft of the moving object received from the moving object burglar alarm apparatus according to embodiment 1.

FIG. 3 is a diagram showing a route by way of which a notification about detection of occurrence of a theft of the vehicle is sent from the moving object burglar alarm apparatus 20 to a user's mobile telephone, and FIG. 4 is a diagram showing an example of a display screen of an electronic mail sent to the mobile telephone when the moving object burglar alarm apparatus 20 detects a theft of the vehicle. Information about the mobile telephone 70, such as an electronic mail address, is registered in the moving object burglar alarm apparatus 20. The user who is a party to the vehicle can receive an electronic mail from the moving object burglar alarm apparatus 20 through the mobile telephone 70 and recognize occurrence of a theft of the vehicle from a message displayed on the screen of the mobile telephone 70. Then, in order to send an answer to the inquiry about whether the moving object burglar alarm apparatus 20 should make a notification about the theft of the vehicle, which is displayed on the screen, to the moving object burglar alarm apparatus 20, the party to the vehicle can access a "home page" specified by an address attached to the on-screen message by using the mobile telephone 70. "123.456.789.00" included in the "home page" address displayed on the screen of the mobile telephone 70 shown in FIG. 4 is a data which is changed every time when a notification of detection of occurrence of a theft of the vehicle is made.

Figure 6:
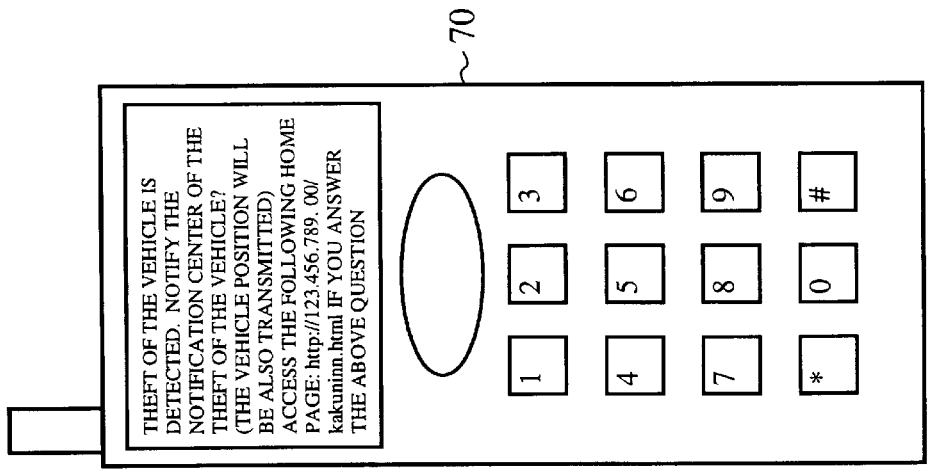
FIG. 6 is a diagram showing a "home page" screen displayed on the communication terminal equipment, by which users are allowed to write an answer to an inquiry about whether the moving object burglar alarm apparatus according to embodiment 1 should make a notification about a theft of the moving object in a "home page"

FIG. 5 is a block diagram showing transmission of "home page" data from the moving object burglar alarm apparatus 20 to the mobile telephone 70, and FIG. 6 is a diagram showing a "home page" screen displayed on the mobile telephone 70 when the user writes an answer to the inquiry about whether the moving object burglar alarm apparatus 20 should make a notification about a theft of the vehicle in the "home page". For example, when the party to the vehicle stays near the vehicle so that he or she can check the appearance of the vehicle and determine that the vehicle is stolen, or when the party to the vehicle can determine that there is a necessity to make a notification about a theft of the vehicle even if he or she cannot check the appearance of the vehicle, the party makes the mobile telephone 70 read a "home page" as shown in FIG. 6 from the "home page" storage unit 36 of the moving object burglar alarm apparatus 20. When the party to the vehicle then selects "Yes (Request for notification)" in the answer column of the "home page", the mobile telephone 70 sends an answer indicating that notification about a theft of the vehicle is requested to the moving object burglar alarm apparatus 20. On the other hand, when the party to the vehicle determines that there is no need to make a notification about a theft of the vehicle and then selects "No (No request for notification)" in the answer column of the "home page", the mobile telephone 70 sends an answer indicating that notification about a theft of the vehicle is not requested to the moving object burglar alarm apparatus 20.

As shown in FIG. 2, the "home page" management unit 37 monitors if an answer to the inquiry about whether the moving object burglar alarm apparatus 20 should make a notification about a theft of the vehicle is transmitted thereto from the party to the vehicle (in step ST6) In the meantime, the "home page" management unit 37 determines whether the timer exceeds 30 minutes and also determines whether or not the "home page" management unit 37 receives an answer to the inquiry about whether the moving object burglar alarm apparatus 20 should make a notification about a theft of the vehicle from the party to the vehicle (in step ST16). When the "home page" management 37 receives an answer from the party to the vehicle before the timer exceeds 30 minutes (in step ST17), the "home page" management 37 determines whether the answer sent from the party to the vehicle by way of the "home page" indicates "Request for notification" or "No request for notification" (in step ST7). When the answer sent from the party to the vehicle shows "Request for notification", after the internet connection control unit 32 disconnects the connection with the Internet, the communication control unit 30 disconnects the line with the ISP (in step ST8). Then, the communication control unit 30 which has acquired the vehicle position information and the vehicle information in step ST2 disconnects the line after calling the notification center at the telephone number stored in the notification center telephone number storage unit 27 by using the communication unit 29 and sending a notification about a theft of the vehicle including the vehicle position information and the vehicle information to the notification center (in step ST9). At this time, the communication control unit 30 can similarly transmit data (in this case, the detection signal acquired by the theft detection unit 10) according to which the theft determination unit 22 determines that a theft of the vehicle occurs and the time when the theft occurs (the time is obtained from the GPS receiver 40) as a notification about a theft of the vehicle.

The notification center calls back the communication unit 29 when necessary in order to keep track of the stolen vehicle. When the communication unit 29 receives a telephone call from the notification center, the communication control unit 30 carries out incoming call processing (in step ST10). As a result, when receiving an instruction for transmission of the vehicle position information (in step ST11), the communication control unit 30 acquires the latest vehicle position information, the vehicle information, and so on (in step ST12), and then transmits them to the notification center. After that, the communication control unit 30 disconnects the line (in step ST13). On the other hand, when receiving an instruction for stopping transmission of the vehicle position information in step ST11, the moving object burglar alarm apparatus 20 releases notification mode and finishes the above-mentioned notification processing.

When the answer sent from the party to the vehicle, in step ST7, indicates "No request for notification", the internet connection control unit 32 disconnects the connection with the Internet, and the communication control unit 30 disconnects the line with the ISP and finishes the above-mentioned notification processing (in step ST8'). On the other hand, in steps ST16 and ST17, when no answer is transmitted and the timer exceeds the predetermined time, e.g., 30 minutes, the internet connection control unit 32 disconnects the connection with the Internet and performs the procedure of steps ST8 to ST13. In other words, when a theft has actually occurred, if no answer is provided from the party to the vehicle at the expiration of the predetermined time, measures against the theft of the vehicle may be taken too late and users may be confused. Therefore, in such a case, the moving object burglar alarm apparatus 20 determines that "Request for notification" is selected and proceeds with the notification processing. The notification center can continuously keep track of the stolen vehicle by repeatedly performing steps ST10 to ST13 at predetermined intervals. In a case where the notification center only has to recognize only the position of the vehicle when receiving a notification of a theft of the vehicle, the moving object burglar alarm apparatus 20 only has to carry out the procedure up to step ST9 as shown in FIG. 7.

As mentioned above, in accordance with this embodiment 1, because the moving object burglar alarm apparatus enables a party to the vehicle to recognize occurrence of a theft of the vehicle from a notification about detection of the occurrence of the theft of the vehicle before notifying a notification center of the occurrence of the theft of the vehicle, and then notifies the notification center of the occurrence of the theft of the vehicle only when the party to the vehicle makes a request for the notification, the moving object burglar alarm apparatus can prevent notification about a theft of the vehicle from being made when the theft detection unit 10 erroneously detects a theft of the vehicle or malfunctions. The moving object burglar alarm apparatus can also prevent an outflow of unnecessary position information about the position of the moving object. Furthermore, because the notification center does not receive any notification that the party to the moving object do not desire and needs not check the position of the moving object, useless use of facilities of the notification center can be prevented. In addition, because the moving object burglar alarm apparatus sends an electronic mail to a mobile telephone which the party to the vehicle always keeps on hand, the electronic mail including messages, such as a notification about detection of occurrence of a theft of the vehicle and an inquiry about whether the moving object burglar alarm apparatus should make a notification about the theft of the vehicle, the user can determine whether a theft of the vehicle has occurred at any time. Furthermore, because the moving object burglar alarm apparatus is so constructed as to acquire an answer to the inquiry about whether the moving object burglar alarm apparatus should make a notification about a theft of the vehicle from a "home page" provided thereby, it is easy for users to send the answer to the inquiry to the moving object burglar alarm apparatus and the moving object burglar alarm apparatus can speedily deal with the answer. In addition, when the time that elapses while waiting for the answer from the party to the vehicle exceeds a predetermined time, the moving object burglar alarm apparatus notifies the notification center of a theft of the vehicle by assuming that "Request for notification" is selected. Therefore, even when the moving object burglar alarm apparatus loses contact with the party to the vehicle and a theft of the vehicle has occurred actually, the moving object burglar alarm apparatus can surely notify the notification center of a theft of the vehicle.

Embodiment 2

In accordance with above-mentioned embodiment 1, the moving object burglar alarm apparatus 20 is so constructed as to accept an answer to an inquiry about whether the moving object burglar alarm apparatus should make a notification about a theft of the vehicle by way of a "home page". In contrast, in accordance with this embodiment 2, a moving object burglar alarm apparatus 20 is so constructed as to accept an electronic mail having an answer to an inquiry about whether the moving object burglar alarm apparatus should make a notification about a theft of the vehicle.

FIG. 8 is a block diagram showing the structure of the moving object burglar alarm apparatus according to embodiment 2 of the present invention. In the figure, the same components as shown in FIG. 1 are designated by the same reference numerals, and the explanation of those components will be omitted hereafter unless explicitly mentioned otherwise. The moving object burglar alarm apparatus 20 according to this embodiment 2 is provided with an electronic mail reception control unit 45 for receiving an electronic mail sent to the moving object burglar alarm apparatus 20, a received electronic mail contents analysis unit 46 for analyzing the contents of the received electronic mail, and a received electronic mail information storage unit 47 for storing a user ID, a password, and key words which are used when the received electronic mail contents analysis unit 46 analyzes the received electronic mail, in addition to the structure of the moving object burglar alarm apparatus 20 shown in FIG. 1 according to above-mentioned embodiment 1. Because the moving object burglar alarm apparatus 20 according to embodiment 2 does not use the IP address acquisition unit 31, the "home page" storage unit 36, and the "home page" management 37 as shown in FIG. 1, these components can be omitted.

Figure 9:
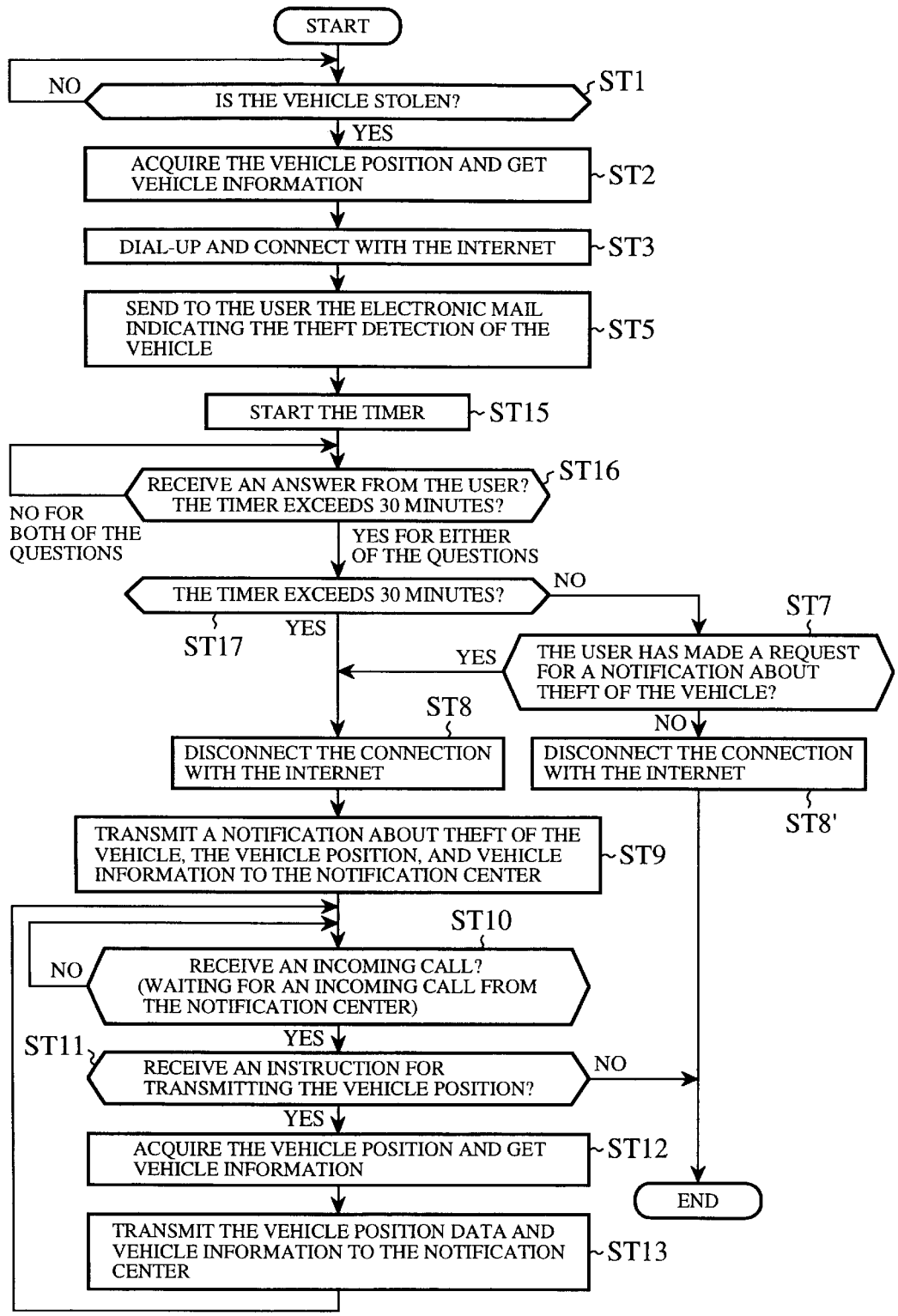
FIG. 9 is a flow chart showing an operation of the moving object burglar alarm apparatus according to embodiment 2.

Next, a description will be made as to an operation of the moving object burglar alarm apparatus 20 according to embodiment 2. FIG. 9 is a flow chart showing the operation of the moving object burglar alarm apparatus 20 according to embodiment 2, and the same steps as shown in FIG. 2 or like steps are designated by the same reference characters.

A theft determination unit 22 determines if a theft of the vehicle occurs by checking to see whether an input detection signal has a value exceeds a threshold stored in a threshold storage unit 23 (in step ST1). When the theft determination unit 22 determines that a theft of the vehicle occurs, a communication control unit 30 acquires vehicle position information from a position information storage unit 25 and gets vehicle information, such as a vehicle ID, from a vehicle information storage unit 26 (in step ST2). The communication control unit 30 and an internet connection control unit 32 then call the telephone number of a dial-up point stored in an internet connection information storage unit 28 by way of a communication unit 29, and sends an Internet connection ID and a password to an ISP by using the Internet connection protocol PPP (Point to Point Protocol) so as to establish Internet connection between the moving object burglar alarm apparatus 20 and the ISP (in step ST3). When the Internet connection between the moving object burglar alarm apparatus 20 and the ISP is established, the electronic mail transmission control unit 35 creates and sends an electronic mail to the electronic mail address of a party to the vehicle, which is stored in a contact person's electronic address storage unit 34, (in step ST5), the electronic mail including messages stored in the message storage unit 33, such as a notification about detection of occurrence of a theft of the vehicle and an inquiry about whether the moving object burglar alarm apparatus 20 should make a notification about the theft of the vehicle.

Communication terminal equipment identified by the electronic mail address can be a mobile telephone, a mobile terminal, a personal computer, a job-oriented terminal, or the like. It is preferable that the communication terminal equipment is a mobile telephone owned by the party to the vehicle in order to allow the user to check the contents of any received electronic mail at hand at any time. Furthermore, in order for the moving object burglar alarm apparatus 20 to receive electronic mails from the user by way of the ISP, the electronic mail transmission control unit 35 acquires the mail address of the moving object burglar alarm apparatus 20 registered in the ISP in advance from the received electronic mail information storage unit 47 and sends the electronic mail having messages by setting the acquired mail address as the electronic mail address of the sender. The electronic mail transmission control unit 35 also starts a timer (not shown in the figure) when sending the electronic mail to the party to the vehicle (in step ST15). In order to allow the moving object burglar alarm apparatus 20 to do some processing when the electronic mail reception control unit 45 does not receive an answer from the user to the inquiry about whether the moving object burglar alarm apparatus 20 should make a notification about a theft of the vehicle, the timer sets a predetermined time, e.g., 30 minutes.

Figure 10:
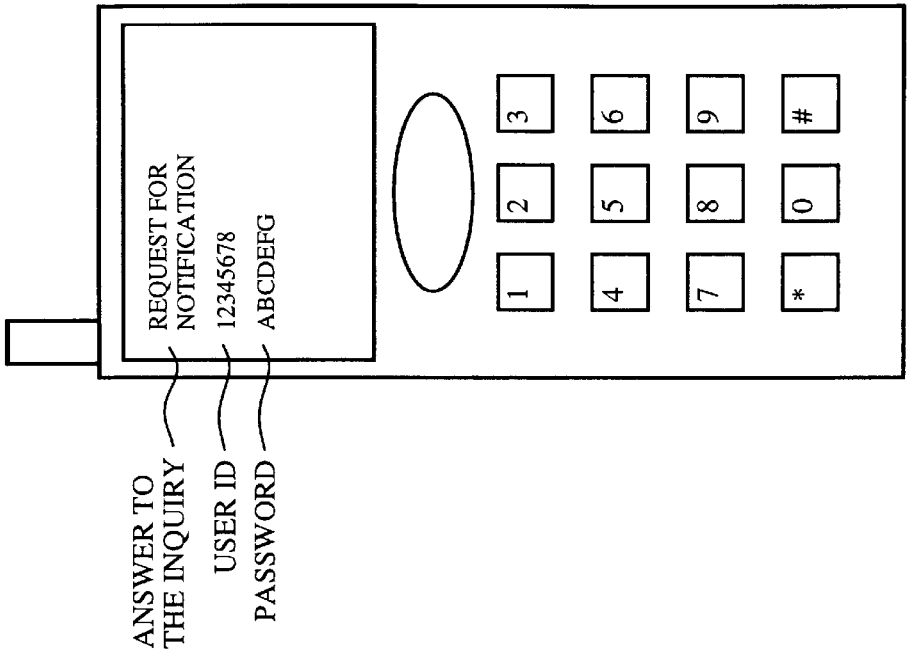
FIG. 10 is a diagram showing a display screen showing a notification about detection of occurrence of a theft of the moving object received from the moving object burglar alarm apparatus according to embodiment 2.

The party to the vehicle receives the electronic mail from the moving object burglar alarm apparatus 20 through a mobile telephone and recognizes occurrence of a theft of the vehicle from a message displayed on the screen of the mobile telephone as shown in FIG. 10. The user writes a key word indicating "Request for notification" in an electronic mail to be sent to the moving object burglar alarm apparatus 20 when determining that the moving object burglar alarm apparatus 20 should make a notification about the theft of the vehicle, and sends the electronic mail to the moving object burglar alarm apparatus 20. In contrast, the user writes a key word indicating "No request for notification" in an electronic mail to be sent to the moving object burglar alarm apparatus 20 when determining that the moving object burglar alarm apparatus 20 should not make a notification about the theft of the vehicle, and sends the electronic mail to the moving object burglar alarm apparatus 20.

Figure 11:
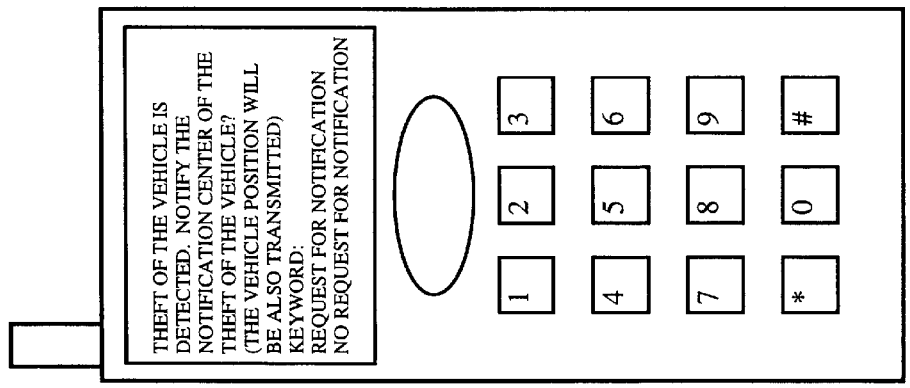
FIG. 11 is a diagram showing an example of a display screen showing a reply mail to be sent back to the moving object burglar alarm apparatus according to embodiment 2.

In order to enable the moving object burglar alarm apparatus 20 to verify whether the received reply electronic mail has been sent from the party to the vehicle, the user is allowed to write his or her user ID and password in the replay electronic mail by using the mobile telephone. FIG. 11 shows an example of the reply electronic mail displayed on the screen of the mobile telephone. The party to the vehicle can select a desired one from among keywords provided in advance in the mobile telephone. As an alternative, the party to the vehicle can select a desired one from among keywords written in the electronic mail sent from the moving object burglar alarm apparatus 20. In the latter case where keywords are written in the electronic mail sent from the moving object burglar alarm apparatus 20, the convenience of customers is improved because the party to the vehicle need not remember any keyword. By additionally writing a write format in the electronic mail to be sent from the moving object burglar alarm apparatus 20 to the party to the vehicle, the convenience of customers is improved because the party to the vehicle only has to complete needed information according to the write format.

The electronic mail reception control unit 45 accesses the electronic mail server of the ISP at predetermined intervals of one or more minutes, e.g., two minutes during the predetermined time period set by the timer, for example, 30 minutes, so as to check to see whether an electronic mail indicating an answer to the inquiry about whether the moving object burglar alarm apparatus 20 should make a notification about a theft of the vehicle has been sent to the mail address of the moving object burglar alarm apparatus 20 from the party to the vehicle (in steps ST16 and ST17). When an electronic mail indicating an answer to the inquiry about whether the moving object burglar alarm apparatus 20 should make a notification about a theft of the vehicle has been sent to the electronic mail server, the moving object burglar alarm apparatus 20 acquires it from the mail server of the ISP and deletes the electronic mail on the electronic mail server of the ISP. The received electronic mail contents analysis unit 46 then verifies the user ID and password written in the received electronic mail from the party to the vehicle against an authorized user's user ID and password stored in the received electronic mail information storage unit 47. When the user ID and password written in the received electronic mail match up with the authorized user's user ID and password, respectively, the received electronic mail contents analysis unit 46 determines whether to notify the notification center of the theft of the vehicle (in step ST7). In order to keep a log of electronic mails from the user's mobile telephone, when acquiring any electronic mail from the electronic mail server of the ISP, the moving object burglar alarm apparatus 20 keeps the electronic Mail stored in the electronic mail server of the ISP instead of deleting it.

Figure 12:
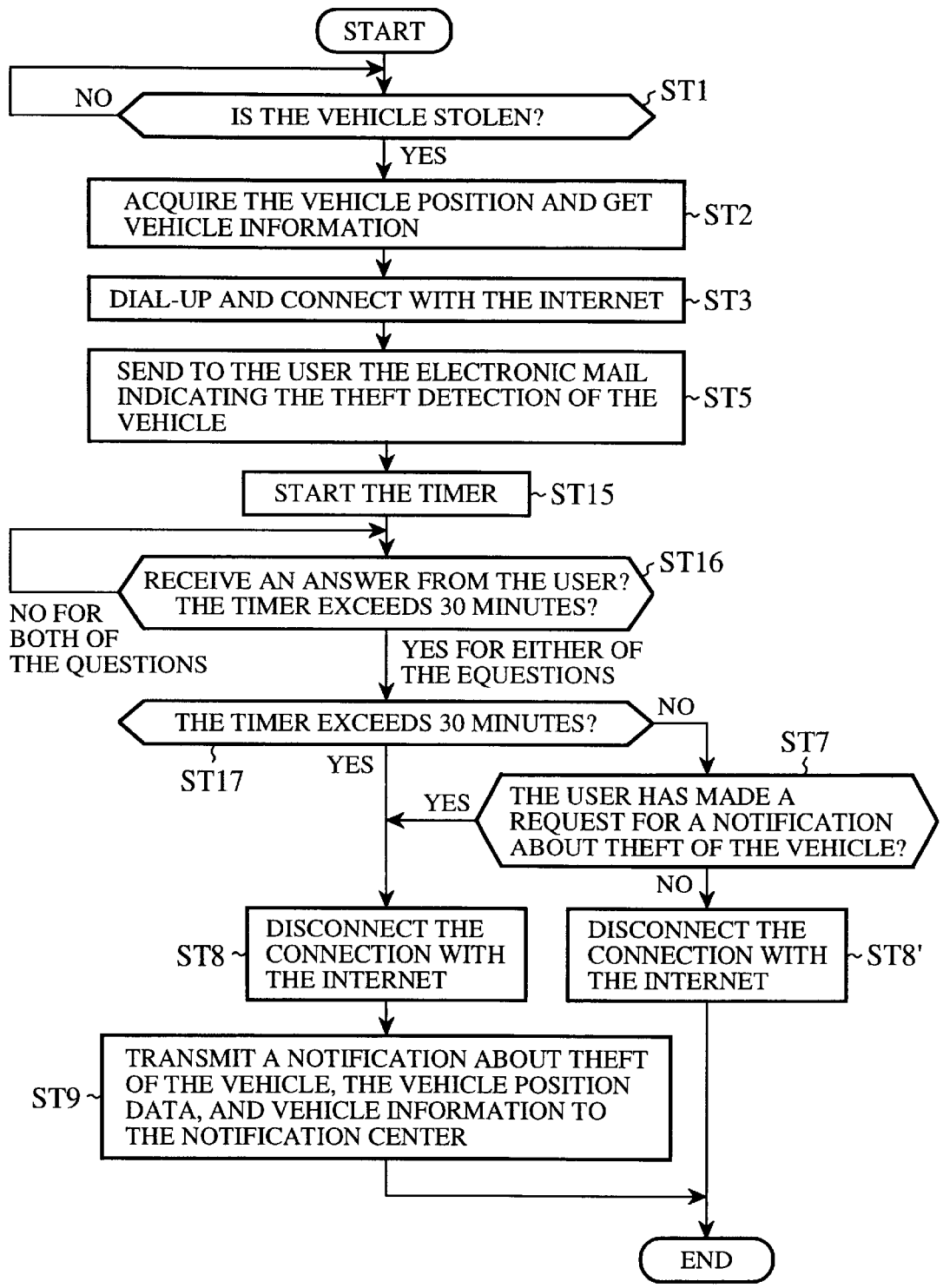
FIG. 12 is a flow chart showing an operation of a moving object burglar alarm apparatus according to a variant of embodiment 2.

When the key word within the answer included in the electronic mail sent from the party to the vehicle is "Request for notification", the moving object burglar alarm apparatus 20 advances to steps ST8 to ST13 in which the moving object burglar alarm apparatus 20 notifies the notification center of the theft of the vehicle. When the key word within the answer sent from the party to the vehicle indicates "No request for notification", the internet connection control unit 32 disconnects the connection with the Internet, and the communication control unit 30 disconnects the line with the ISP and finishes the above-mentioned notification processing (in step ST8'). On the other hand, in steps ST16 and ST17, when no answer is transmitted and the timer exceeds the predetermined time, e.g., 30 minutes, the internet connection control unit 32 disconnects the connection with the Internet and performs the procedure of steps ST8 to ST13. In other words, when a theft has actually occurred, if no answer is provided from the party to the vehicle at the expiration of the predetermined time, measures against the theft of the vehicle may be taken too late and users may be confused. Therefore, in such a case, the moving object burglar alarm apparatus 20 determines that "Request for notification" is selected and proceeds with the notification processing. The notification center can continuously keep track of the stolen vehicle by repeatedly performing steps ST10 to ST13 at predetermined intervals, as in the case of embodiment 1. In a case where the notification center only has to recognize only the position of the vehicle when receiving a notification of a theft of the vehicle, the moving object burglar alarm apparatus 20 only has to finish the notification processing after sending a notification about the theft of the vehicle to the notification center (in step ST9), as shown in the flowchart of FIG. 12.

As mentioned above, in accordance with this embodiment 2, because the moving object burglar alarm apparatus enables a party to the vehicle to recognize occurrence of a theft of the vehicle from a notification about detection of occurrence of a theft of the vehicle before notifying a notification center of occurrence of a theft of the vehicle, and then notifies the notification center of occurrence of a theft of the vehicle only when the party to the vehicle makes a request for the notification, the moving object burglar alarm apparatus can prevent notification about a theft of the vehicle from being made when the theft detection unit 10 erroneously detects a theft of the vehicle or malfunctions. In addition, because the moving object burglar alarm apparatus sends an electronic mail to a mobile telephone which the party to the vehicle always keeps on hand, the electronic mail including messages, such as a notification about detection of occurrence of a theft of the vehicle and an inquiry about whether the moving object burglar alarm apparatus should make a notification about a theft of the vehicle, the user can determine whether a theft of the vehicle has occurred at any time. Furthermore, because the moving object burglar alarm apparatus is so constructed as to acquire an answer to the inquiry about whether the moving object burglar alarm apparatus should make a notification about a theft of the vehicle from a reply electronic mail and users are allowed to send an answer to the inquiry to the moving object burglar alarm apparatus by creating the reply electronic mail including the answer according to a write format attached to the received electronic mail while seeing the received electronic mail displayed on the screen of communication terminal equipment, the moving object burglar alarm apparatus can speedily deal with the answer.

In addition, when the time that elapses while waiting for the answer from the party to the vehicle exceeds a predetermined time, the moving object burglar alarm apparatus notifies the notification center of a theft of the vehicle by assuming that "Request for notification" is selected. Therefore, even when the moving object burglar alarm apparatus loses contact with the party to the vehicle and a theft of the vehicle has occurred actually, the moving object burglar alarm apparatus can surely notify the notification center of the theft of the vehicle.

Many widely different embodiments of the present invention may be constructed without departing from the spirit and scope of the present invention. It should be understood that the present invention is not limited to the specific embodiments described in the specification, except as defined in the appended claims.

What is claimed is:

1. A moveable object burglar alarm apparatus that sends a notification about a theft of a moveable object to a certain notification center when a theft detection means detects a theft of the moveable object, wherein said apparatus comprises:

an inquiry means for inquiring, when said theft detection means detects a theft of the moveable object, whether said moveable object burglar alarm apparatus should make a notification about the theft of the moveable object, of communication terminal equipment disposed outside said moveable object burglar alarm apparatus; and a theft notification means for determining whether to notify said notification center of the theft of the moveable object according to an answer to said inquiry from said communication terminal equipment, and for notifying said notification center of the theft of the moveable object when the answer indicates that a notification about the theft is requested, wherein said inquiry means inquires whether said moveable object burglar alarm apparatus should make a notification about the theft of the moveable object of said communication terminal equipment by using an electronic mail including an address of a "home page" that exists on an Internet, which is acquired by said moveable object burglar alarm apparatus, and said theft notification means determines whether to notify said notification center of the theft of the moveable object according to the answer written into said "home page" that is accessed by said communication terminal equipment according to the address.

2. The moveable object burglar alarm apparatus according to claim 1, wherein said apparatus further comprises a means for, when receiving a transmission instruction for transmitting a current position of the moveable object from said notification center after notifying said notification center of the theft of the moveable object, acquiring and transmitting the current position of the moveable object to said notification center.

3. A moveable object burglar alarm apparatus that sends a notification about a theft of a moveable object to a certain notification center when a theft detection means detects a theft of the moveable object, wherein said apparatus comprises:

an inquiry means for inquiring, when said theft detection means detects a theft of the moveable object, whether said moveable object burglar alarm apparatus should make a notification about the theft of the moveable object, of communication terminal equipment disposed outside said moveable object burglar alarm apparatus; and a theft notification means for determining whether to notify said notification center of the theft of the moveable object according to an answer to said inquiry from said communication terminal equipment, and for notifying said notification center of the theft of the moveable object when the answer indicates that a notification about the theft is requested, wherein when a time that elapses during waiting for the answer exceeds a predetermined time, said theft notification means notifies said notification center of the theft of the moveable object.

4. The moveable object burglar alarm apparatus according to claim 1, wherein said communication terminal equipment is a mobile telephone owned by a party to the moveable object.

* * * * *